(12) United States Patent
Reed et al.

(10) Patent No.: US 8,607,934 B2
(45) Date of Patent: Dec. 17, 2013

(54) AIR/HYDRAULIC INJECTION LUBRICATION UNIT

(76) Inventors: Duane Lee Whitney Reed, Houston, TX (US); Brian Kingsley Reed, Houston, TX (US)

(*) Notice: Subject to any disclaimer, the term of this patent is extended or adjusted under 35 U.S.C. 154(b) by 882 days.

(21) Appl. No.: 11/973,611

(22) Filed: Oct. 10, 2007

(65) Prior Publication Data
US 2009/0314581 A1    Dec. 24, 2009

(51) Int. Cl.
| F16N 11/10 | (2006.01) |
| F16N 13/16 | (2006.01) |
| F16N 7/36 | (2006.01) |
| F16N 7/38 | (2006.01) |
| F16N 13/00 | (2006.01) |
| F01M 1/00 | (2006.01) |

(52) U.S. Cl.
USPC ............................................. 184/54; 184/26

(58) Field of Classification Search
USPC ................................. 184/54, 26; 222/255, 324
See application file for complete search history.

(56) References Cited

U.S. PATENT DOCUMENTS

| 132,395 | A | * | 10/1872 | Gross | 384/398 |
| 208,931 | A | * | 10/1878 | Seibert | 184/54 |
| 368,702 | A | * | 8/1887 | Bischoff | 184/26 |
| 377,253 | A | * | 1/1888 | Hewlett | 184/77 |
| 532,231 | A | * | 1/1895 | Davies | 184/18 |
| 786,637 | A | * | 4/1905 | Flinn | 184/54 |
| 1,436,056 | A | * | 11/1922 | Sherwood | 222/51 |
| 1,646,477 | A | * | 10/1927 | Davis et al. | 222/628 |
| 1,648,896 | A | * | 11/1927 | Gresser | 222/323 |
| 1,694,624 | A | * | 12/1928 | Piquerez | 222/628 |
| 1,704,179 | A | * | 3/1929 | De Forest | 417/417 |
| 1,711,169 | A | * | 4/1929 | Braselton et al. | 417/211 |
| 1,860,716 | A | * | 5/1932 | Lockwood | 417/496 |
| 1,868,701 | A | * | 7/1932 | Goerland | 222/263 |
| 1,912,240 | A | * | 5/1933 | Zerk | 184/26 |
| 1,979,247 | A | * | 11/1934 | Bijur | 184/7.3 |
| 2,007,482 | A | * | 7/1935 | Stitt | 184/26 |
| 2,081,907 | A | * | 6/1937 | Bijur | 184/26 |
| 2,169,514 | A | * | 8/1939 | Buzzard et al. | 222/189.11 |
| 2,461,197 | A | * | 2/1949 | Chambers | 62/239 |
| 2,563,636 | A | * | 8/1951 | Ballard | 222/389 |
| 2,616,523 | A | * | 11/1952 | Davis | 184/26 |
| 2,620,940 | A | * | 12/1952 | Ginter | 220/4.01 |
| 2,777,610 | A | * | 1/1957 | Fox et al. | 222/130 |
| 3,027,625 | A | * | 4/1962 | Milstead | 407/11 |
| 3,095,062 | A | * | 6/1963 | Neely | 184/1.5 |
| 3,221,948 | A | * | 12/1965 | Kalist | 222/334 |
| 3,248,023 | A | * | 4/1966 | Dienenthal et al. | 222/389 |
| 3,286,790 | A | * | 11/1966 | Kestel | 184/6 |
| 3,305,137 | A | * | 2/1967 | Gauthier et al. | 222/136 |
| 3,332,411 | A | * | 7/1967 | Bloom et al. | 123/196 R |
| 3,651,994 | A | * | 3/1972 | Nordenholt | 222/160 |

(Continued)

Primary Examiner — William A Rivera
Assistant Examiner — Henry Liu
(74) Attorney, Agent, or Firm — Delphine James

(57) ABSTRACT

The present invention is an air/hydraulic injection lubrication unit. The present invention is embodied in a handheld lubrication system conveniently transported in a carrying case. A frame provides a base on which the system components are mounted. The system components include a lubricant barrel assembly in conjunction with a cradle assembly and an air/hydraulic pressure pump removably-mounted upon the frame. A hose assembly at one end is releaseably fastened to the discharge end of the lubricant barrel assembly. When the air/hydraulic pressure pump is activated, the lubricant or other material in the lubricant barrel is forced out of the hose assembly through a lubricant discharge unit located at the opposing end of the hose assembly.

5 Claims, 5 Drawing Sheets

(56) References Cited

U.S. PATENT DOCUMENTS

| | | | |
|---|---|---|---|
| 3,940,065 A * | 2/1976 | Ware et al. | 239/146 |
| 4,028,473 A * | 6/1977 | Conti | 427/434.7 |
| 4,089,446 A * | 5/1978 | Logan et al. | 222/609 |
| 4,090,640 A * | 5/1978 | Smith et al. | 222/52 |
| 4,201,318 A * | 5/1980 | Adams | 222/324 |
| 4,266,693 A * | 5/1981 | Pfeiffer | 222/135 |
| 4,349,085 A * | 9/1982 | Roser | 184/6.15 |
| 4,581,991 A * | 4/1986 | Mooney | 99/646 R |
| 4,651,897 A * | 3/1987 | Johnson | 222/55 |
| 4,739,862 A * | 4/1988 | Mullis | 184/6.22 |
| 4,802,555 A * | 2/1989 | Matsunaga et al. | 184/15.1 |
| 4,842,432 A * | 6/1989 | Snetting | 401/197 |
| 4,926,904 A * | 5/1990 | Polk et al. | 137/565.15 |
| 4,976,372 A * | 12/1990 | Rogers, Jr. | 222/324 |
| 5,073,092 A * | 12/1991 | Gebauer et al. | 417/383 |
| 5,154,317 A * | 10/1992 | Roppolo, III | 222/66 |
| D365,583 S * | 12/1995 | Viken | D15/151 |
| 5,494,191 A * | 2/1996 | Benson | 222/23 |
| 5,667,113 A * | 9/1997 | Clarke et al. | 222/608 |
| 5,810,213 A * | 9/1998 | Flores et al. | 222/610 |
| 5,873,500 A * | 2/1999 | Homburg et al. | 222/608 |
| 6,071,097 A * | 6/2000 | Gruett et al. | 417/553 |
| 6,435,846 B1 * | 8/2002 | Cooper et al. | 417/415 |
| 6,615,866 B2 * | 9/2003 | Cook | 137/565.19 |
| 6,631,787 B2 * | 10/2003 | Conley et al. | 184/6.14 |
| 6,648,177 B2 * | 11/2003 | Burger | 222/108 |
| 6,986,407 B2 * | 1/2006 | Conley et al. | 184/7.4 |
| D538,487 S * | 3/2007 | Amadio | D32/4 |
| 7,354,511 B2 * | 4/2008 | Becker | 210/167.02 |
| D633,263 S * | 2/2011 | Fay | D32/15 |
| 7,886,876 B2 * | 2/2011 | Carpenter et al. | 184/24 |
| 2003/0015375 A1 * | 1/2003 | Yokotani et al. | 184/24 |
| 2006/0054418 A1 * | 3/2006 | Paluncic et al. | 184/15.2 |

* cited by examiner

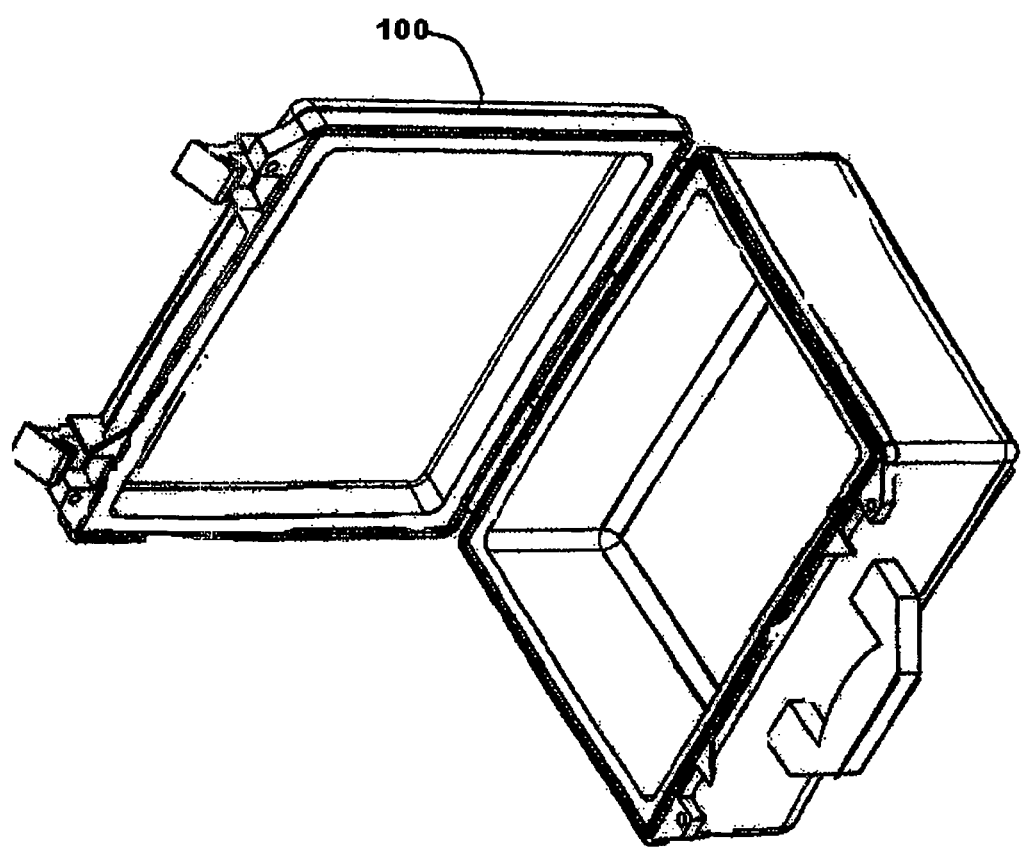

AIR/HYDRAULIC INJECTION LUBRICATION UNIT

BACKGROUND

The present invention relates to lubrication equipment. More specifically, the present invention relates to air/hydraulic injection lubrication guns. Air/Hydraulic injection guns are used for injecting materials into valves and pumps at a fast controlled discharge rate. The present invention provides a uniquely designed portable lightweight injection gun with a carrying frame unit.

BRIEF DESCRIPTION OF DRAWINGS

FIG. 5 is the top view of the carrying case.

SUMMARY

It is an object of the present invention to provide a rugged, easy operating, light weight unit with an extremely fast discharge rate.

It is another object of the present invention to provide the capability of pumping standard and special materials including highly viscous lubricants, packing, sealants and cleaners.

The present invention is embodied in a handheld lubrication system conveniently transported in a carrying case. A frame provides a base on which the system components are mounted. The major system components include a lubricant barrel assembly, a cradle assembly and an air/hydraulic pressure pump removably mounted upon the frame. A hose assembly at one end is releaseably fastened to the discharge end of the lubricant barrel. When the air/hydraulic pressure pump is activated, the material in the lubricant barrel is forced out of the hose assembly through a lubricant discharge unit located at the opposing end of the hose assembly.

Other objects and advantages of the present invention will become apparent from the following detailed description when viewed in conjunction with the accompanying drawings, which set forth certain embodiments of the invention.

DETAILED SPECIFICATIONS

The detailed embodiment of the present invention is disclosed herein. The disclosed embodiment is not to be interpreted as limited, but merely as a basis for teaching one skilled in the art to make and/or use the present invention.

Figure 1:
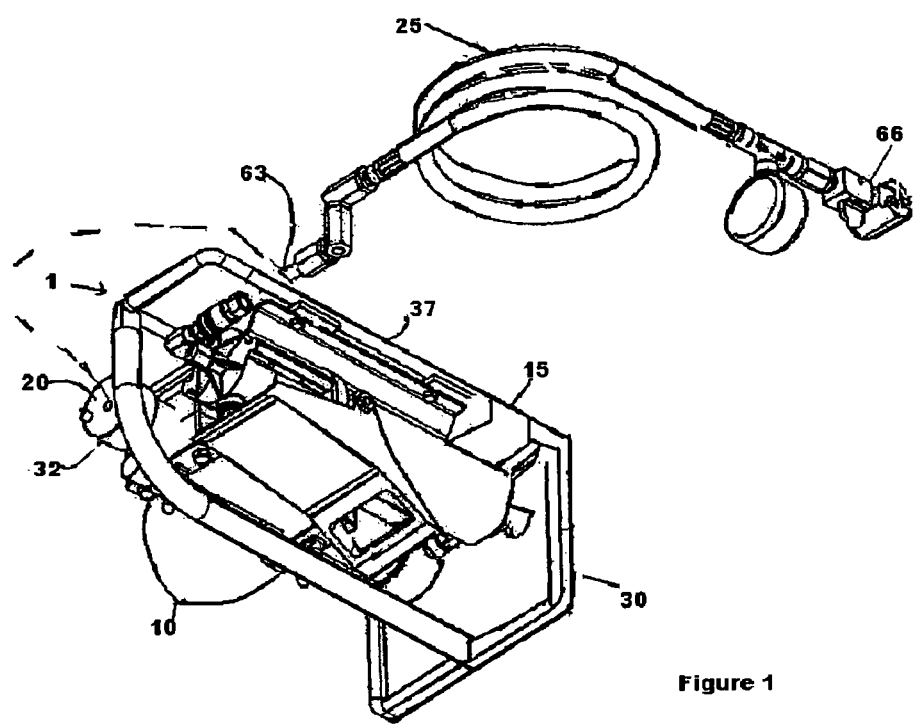
FIG. 1 is a perspective view of the portable handheld lubrication system in an upright position
Figure 2:
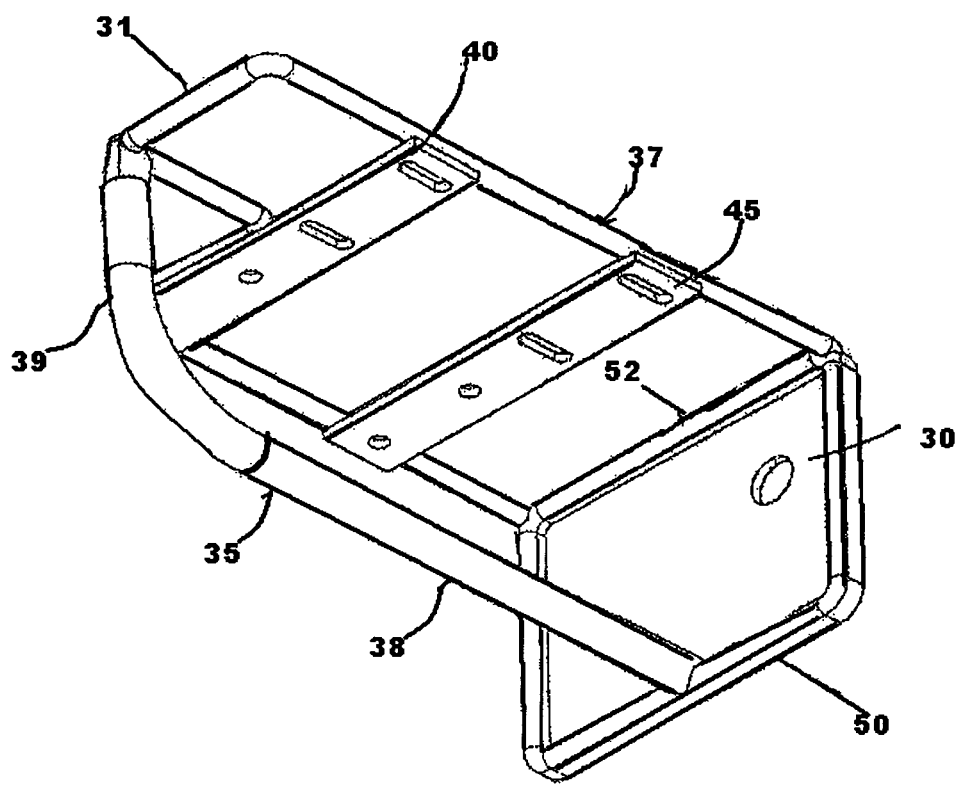
FIG. 2 is a top view of the frame.
Figure 3:
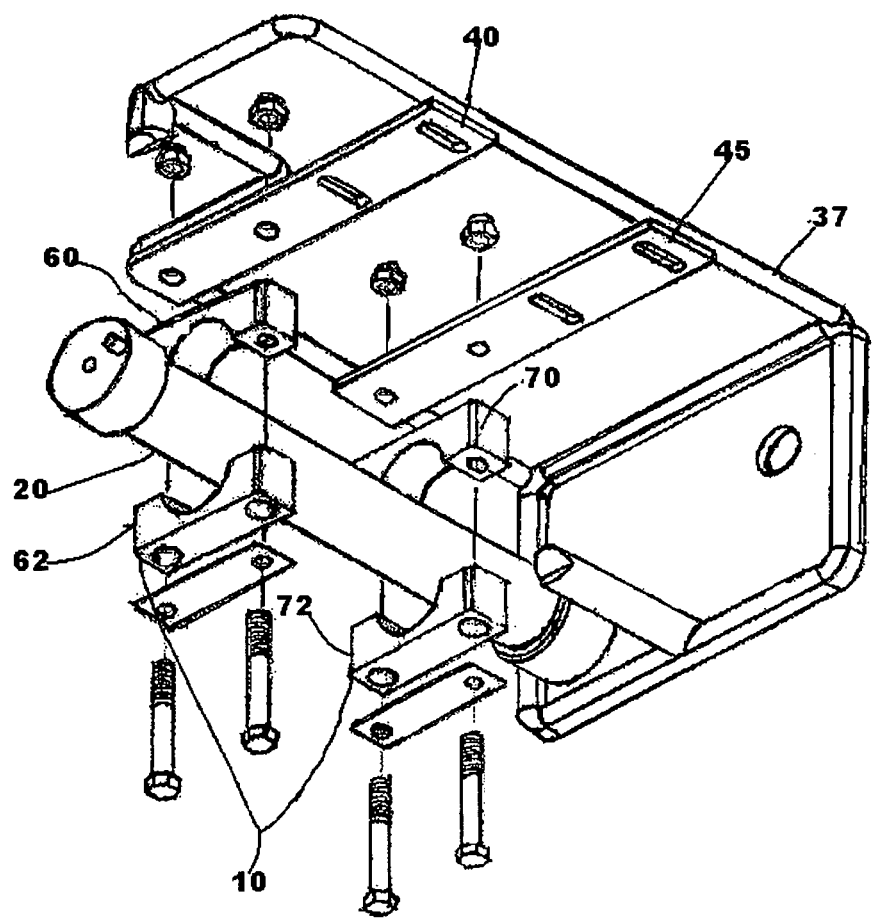
FIG. 3 is an exploded view of the cradle assembly, shown in conjunction with the frame and lubricant barrel assembly.

As shown in FIGS. 1, 2, and 3 the present invention, lubrication system 1, comprise a supporting back frame (37) supporting an air/hydraulic pump (15) and lubricant barrel assembly (20)—held in place by a cradle assembly (10). The air/hydraulic pump (15) and the lubricant barrel assembly (20), along with the supporting hose assembly (25) and connection hardware, work together side by side in a parallel fashion. Air/hydraulic pump (15) is securely and removably fastened to the supporting back frame (37). The lubricant barrel assembly (20) is securely and removably fastened to the cradle assembly (10). The cradle assembly (10) is securely and removably fastened to the supporting back frame (37). The unit comprises five major components: an all aluminum frame, a 10,000 PSI air/hydraulic pump, a "K" * lubricant assembly barrel, a discharge hose assembly, and a carrying case. The Air/hydraulic pump (15) and lubricant barrel assembly (20) work together in a parallel fashion upon the supporting back frame (37).

* Note: The description, "K" lubricant barrel assembly is interchangeable. See your page 4.0015

The supporting back frame (37) is uniquely designed to support the lubricant barrel assembly (20) in conjunction with the cradle assembly (10) and the air/hydraulic pump (15) as shown in FIG. 1. Supporting back frame (37) further includes a charging base (30), supporting back frame (37) and a carrying handle. Charging base (30) is a rectangular flat plane platform with an opening on one side to support the mounting of an air/hydraulic pump (15) onto supporting back frame (37). Charging base 30 is further defined by a front peripheral edge 50 and back peripheral edge 52.

In the preferred embodiment as depicted in FIG. 2, back frame (37) is a flat substantially rectangular platform peripherally surrounded by tubular member 31. However, the charging base 30 is not limited by these dimensions. An upper bracket (40) and lower bracket member (45) are secured parallel and horizontally across supporting back frame (37).* As depicted, supporting back frame (37), perpendicularly aligned and affixed to back peripheral edge 52 of charging base (30) and extending linearly upward therefrom.

* Supporting back frame (37) is not limited to the type of materials it is manufactured with, nor is the shape or size limited. The colors and/or color combinations can vary.

The air/hydraulic pump (15) and lubricant barrel assembly (20) as shown in FIG. 1 can be various brands, models or sizes. The barrel can range in size from 4" up to 30" in length, but is not limited by these dimensions. The colors and/or color combinations can vary.

The lubricant barrel assembly (20) can also be described as a container, injector, material holder, reservoir, sealant barrel, etc. This item can be any shape, size, or made out of varying materials. It can accommodate greases, oils, lubricants, cleaners, solvents, packing, sealants, or other types of material that are commonly or specially pumped into vales, pumps, or other machinery or systems, etc.

Figure 4:
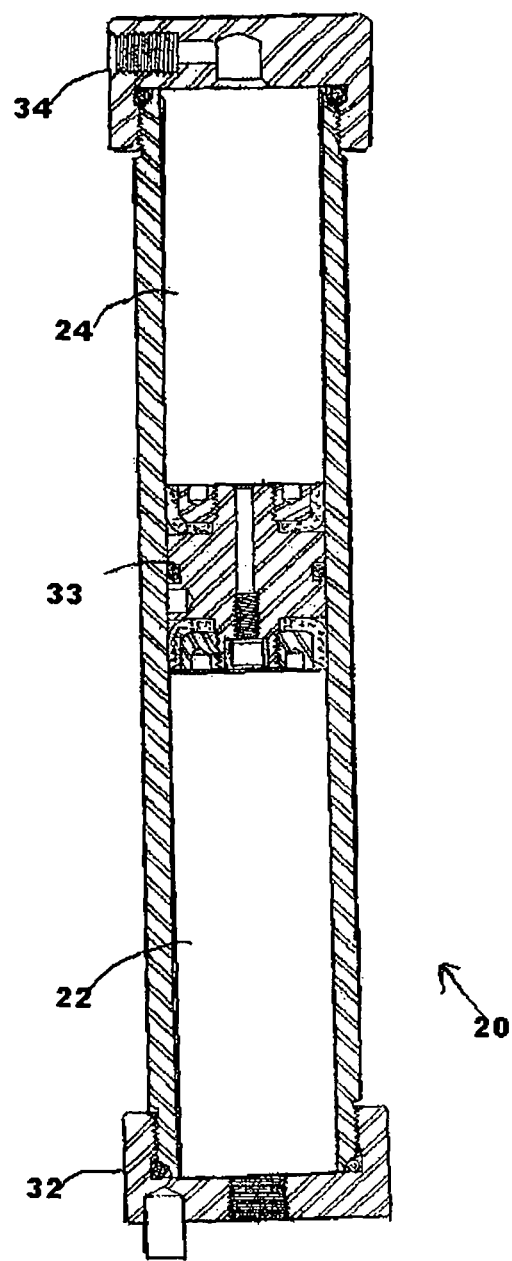
FIG. 4 is a cross-sectional view of the lubricant barrel assembly.

In FIG. 4, there is shown the internal structure of the lubricant barrel assembly 20. As depicted in FIG. 4, lubricant barrel assembly 20 has an internal bore dissected into an upper chamber 22 and a lower chamber 24. Piston assembly 30 is situated between upper chamber 22 and lower chamber 24. Upper chamber 22 forms a chamber for receiving the lubricant or other material and the lower chamber 24 forms a chamber for receiving the hydraulic fluid from the air/hydraulic pump 15 (shown in FIG. 1).

Upper end 22 further includes upper cap member 32 in threaded engagement with the top end of upper end 22. Lower end 24 includes lower cap member 34 in threaded engagement with the lower end of lower chamber 24. Upper cap member 32 is removably coupled to discharge hose assembly 25 shown in FIG. 1 and lower cap member 34 is removeably coupled to the air/hydraulic pump as shown in FIG. 1. Both upper cap member 32 and lower cap member 34 can be respectively removed from upper end 22 and lower end 24.

Lower chamber 24 is in fluid communication with air/hydraulic pump 15 shown in FIG. 1 through coupling 64 attached to lower cap member 34. Upper chamber 22 is removably coupled to discharge hose assembly 25 and is adapted to receive lubricant material therein. As hydraulic fluid is pumped into lower chamber 24, the piston assembly 33 is pushed upward forcing the lubricant or other material into and through discharge hose assembly 25 shown in FIG. 1.

As the hydraulic fluid is forced in and out of lower chamber 24, piston assembly 33 float upward and downward, respectively, thereby allowing more lubricant material to be inserted into upper chamber 22.

As shown in FIG. 2, carrying handle 35 comprises a curved portion 39 extending into an elongated linear portion 38. The elongated linear portion 38 extends downward to the front peripheral edge 50 of the charging base 30 and is permanently affixed thereto. Curved portion 39 extends upward to the top edge of the back frame 37 and is permanently affixed thereto.

As shown in FIG. 3, cradle assembly 10 is uniquely designed with bracket assemblies for supporting the attachment of lubricant barrel assembly 20 thereto. Upper coupler member (60, 62) and lower coupler member (70, 72) are specifically designed to retain the lubricant barrel assembly 20 to cradle assembly. Upper coupler member (60, 62) and lower coupler member (70, 72) are respectively connected to the upper bracket member and the lower bracket member. Each coupler member is segmented with a front section (60, 70) and a back section (62, 72) with an opening adapted to encircle lubricant barrel 20.

While not in use, the portable lubrication unit 1 shown in FIG. 1, can be conveniently stored in carrying case 100 shown in FIG. 5. Carrying case 100 has a suit case-type configuration dimensioned to store lubrication unit 1 in a horizontal position. The carrying case 100 have a cover hingedly connected to a bottom compartment. Surrounding the bottom compartment are a plurality of sidewalls interconnected to form a container with a enough depth dimensioned to support and encompass the assembled system components in a horizontal position.

In operation, lubrication unit 1 is removed from carrying case (100) illustrated in FIG. 5. The air/hydraulic injection lubrication unit can be easily maneuvered from standing in an upright vertical position on charging base (30) into a horizontal position lying on supporting back frame (37) as shown in FIG. 1. By placing the unit on charging base (30) in the vertical position, the operator can easily load material into lubricant barrel assembly (20) into upper chamber (22) illustrated in FIG. 4. A hose assembly (25) at one end is releaseably coupled to the discharge end (32) of the lubricant barrel assembly (20). When the air/hydraulic pressure pump (15) is activated, the lubricant material in the lubricant barrel assembly (20) is forced out of the hose assembly (25) through a discharge unit (66) located at the opposing end of the hose assembly (25). The discharge unit (66) is used for lubricating material components such as valves, pumps, seals and other similar components requiring lubrication. Air activated hydraulics pump that is pumping hydraulics but is using pneumatics to drive it.

What is claimed is:

1. A portable handheld lubrication system with a plurality of assembled system components designed to lubricate valves or/and other material components, the lubrication system comprising: a charging base, a supporting back frame with a longitudinal axis and a handle; the charging base having a flat planar platform defined by a front peripheral edge and back peripheral edge; a lubricant barrel assembly mounted adjacent to in a parallel and upright arrangement along the longitudinal axis to a pneumatic driven hydraulic pump upon the flat planar platform of the charging base; the supporting back frame having a substantially flat platform perpendicularly aligned and affixed to the back peripheral edge of the charging base and extending linearly upward therefrom to a top edge; a cradle assembly mounted to the supporting back frame and coupled to the lubricant barrel assembly wherein the lubricant barrel assembly is encapsulated and held in the upright arrangement; the cradle assembly aligned adjacent to and parallel to the pneumatic driven hydraulic pump; the handle having a curved portion integrally formed with an elongated linear portion; the elongated linear portion extending downward to the front peripheral edge of the charging base and being permanently affixed thereto; the curved portion extending upward to a predetermined position on the frontal top edge of the supporting back frame and being permanently affixed thereto; the handle disposed a predetermined distance in front of the supporting back frame wherein a support area is defined beneath the handle and above the platform of the charging base; the lubricant assembly and the pneumatic driven hydraulic pump being disposed in the parallel and upright arrangement within the support area above the platform of the charging base; when said system lies flat on an underside of the cradle; the lubricant barrel assembly and the pneumatic driven hydraulic pump lies vertically upward along the longitudinal axis; wherein the cradle assembly further comprises an upper bracket assembly cooperatively engaged with a lower bracket assembly; the upper bracket assembly and the lower bracket assembly being affixed parallel to each other and being affixed horizontally across the supporting back frame at an intermediate position; and the lubricant barrel assembly operationally coupled to the upper and lower bracket assembly wherein the lubricant barrel assembly is retained in an upright position.

2. The lubrication system of claim 1 wherein the lubrication barrel
   assembly further comprises;
      a hose assembly having a dispersing member for lubricating the material components;
      a hollow cylinder dissected into an upper chamber and lower chamber with a floating piston assembly situated therebetween;
      the upper chamber configured to receive a lubricant material therein;
      the upper chamber being releaseably coupled to the hose assembly thereto;
      the lower chamber in fluid communication with the pneumatic driven hydraulic pump for receiving hydraulic fluid therein such than when the pneumatic driven hydraulic pump is activated by air pressure the piston assembly is pushed upward forcing lubricant into and through the hose assembly and into the dispersing member.

3. The lubrication system of claim 1 further comprising a carrying case having a compartment dimensioned to support and encompass the plurality of assembled system components.

4. The lubrication system of claim 1 wherein the supporting back frame further comprises a tubular member circumferentially and peripherally surrounding an outer edge of the supporting back frame.

5. The lubrication system of claim 1 wherein the charging base has a rectangular shape.

* * * * *